US011444505B2

(12) United States Patent
Pei et al.

(10) Patent No.: US 11,444,505 B2
(45) Date of Patent: Sep. 13, 2022

(54) SEALING STRUCTURE OF ELECTRIC-MACHINE-SHAFT EXTENSION END

(71) Applicant: Jing-Jin Electric Technologies Co., Ltd., Beijing (CN)

(72) Inventors: Zhengqiang Pei, Beijing (CN); Ping Yu, Beijing (CN); Haitao Jin, Beijing (CN); Pengfei Liu, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 0 days.

(21) Appl. No.: 15/733,636

(22) PCT Filed: Nov. 6, 2018

(86) PCT No.: PCT/CN2018/114170
§ 371 (c)(1),
(2) Date: Sep. 22, 2020

(87) PCT Pub. No.: WO2019/184357
PCT Pub. Date: Oct. 3, 2019

(65) Prior Publication Data
US 2021/0036575 A1 Feb. 4, 2021

(30) Foreign Application Priority Data
Mar. 26, 2018 (CN) .......................... 201810252881.4

(51) Int. Cl.
*H02K 5/12* (2006.01)
*H02K 5/124* (2006.01)
*H02K 5/173* (2006.01)

(52) U.S. Cl.
CPC ............. *H02K 5/124* (2013.01); *H02K 5/173* (2013.01)

(58) Field of Classification Search
CPC ............ H02K 5/00; H02K 5/12; H02K 5/124; H02K 5/17; H02K 5/173
See application file for complete search history.

(56) References Cited

U.S. PATENT DOCUMENTS

| 3,934,311 A | 1/1976 | Thompson |
| 2007/0070806 A1 | 3/2007 | Swisher |
| 2014/0255224 A1 | 9/2014 | Minogue |

FOREIGN PATENT DOCUMENTS

| CN | 201134713 Y | 10/2008 | |
| CN | 104806736 A * | 7/2015 | ............. F16H 57/02 |

(Continued)

*Primary Examiner* — Tran N Nguyen
(74) *Attorney, Agent, or Firm* — LKGlobal | Lorenz & Kopf, LLP

(57) ABSTRACT

The present disclosure relates to the field of shaft sealing, and particularly relates to a sealing structure of an electric-machine-shaft extension end. The sealing structure of an electric-machine-shaft extension end includes an electric-machine end cap and an electric-machine-shaft extension end, the electric-machine-shaft extension end is mounted to the electric-machine end cap via a bearing, a double-oil-seal structure is provided between the electric-machine end cap and the electric-machine-shaft extension end, the double-oil-seal structure includes an oil-seal seat that is connected to the electric-machine end cap and an outer-side oil seal and an inner-side oil seal that are provided inside the oil-seal seat, the outer-side oil seal and the inner-side oil seal are provided face to face, and are interference-fitted to the oil-seal seat, and an oil storing chamber and an oil-seal spacer ring contained inside the oil storing chamber are provided between the outer-side oil seal and the inner-side oil seal.

7 Claims, 4 Drawing Sheets

(56) References Cited

FOREIGN PATENT DOCUMENTS

| CN | 107005123 A    | 8/2017  |
|----|----------------|---------|
| CN | 206452224 U    | 8/2017  |
| CN | 108429384 A    | 8/2018  |
| DE | 102008026960 A1| 12/2009 |
| JP | S58174963 U    | 11/1983 |
| JP | H03056052 A    | 3/1991  |
| JP | H06153478 A    | 5/1994  |

\* cited by examiner

SEALING STRUCTURE OF ELECTRIC-MACHINE-SHAFT EXTENSION END

CROSS-REFERENCE TO RELATED APPLICATION

This Application is a U.S. National-Stage entry under 35 U.S.C. § 371 based on International Application No. PCT/CN2018/114170, filed Nov. 6, 2018 which was published under PCT Article 21(2) and which claims priority to Chinese Application No. 201810252881.4, filed Mar. 26, 2018, which are all hereby incorporated herein in their entirety by reference.

TECHNICAL FIELD

This Application pertains to the technical field of shaft sealing, and particularly relates to a sealing structure of an electric-machine-shaft extension end.

BACKGROUND

Because electric-machine shafts are rotating members, the water tightness at the shaft penetration points is difficult to be guaranteed, and electric machines easily suffer from water penetration or are even burned up, which affects the service life of the electric machines. Conventional electric-machine sealing structures mostly employ reinforced seal, but the sealing members are susceptible to be affected by the environment. Furthermore, except oil cooled electric machines, the other electric machines do not have a lubricating medium in the interior, and without lubricating the sealing members have a shortened life, and easily wear the main shaft of the electric machine. Therefore, the electric machine is required to be maintained frequently, which cannot satisfy the requirements for use. In addition, if the front-end bearing of electric machines is not properly protected, the bearing may be damaged very easily, which in turn causes failures of the electric machines. In addition, other objects, desirable features and characteristics will become apparent from the subsequent summary and detailed description, and the appended claims, taken in conjunction with the accompanying drawings and this background.

SUMMARY

Aiming at the above problems, an object of the present disclosure is to provide a sealing structure of an electric-machine-shaft extension end, to solve the problem that the sealing members of conventional electric-machine sealing structures are susceptible to be affected by the environment, have a shortened life, and easily wear the main shaft of the electric machine.

In order to achieve the above objects, the present disclosure employs the following technical solutions:

a sealing structure of an electric-machine-shaft extension end, comprising an electric-machine end cap and an electric-machine-shaft extension end, and the electric-machine-shaft extension end being mounted to the electric-machine end cap via a bearing, wherein a double-oil-seal structure is provided between the electric-machine end cap and the electric-machine-shaft extension end, the double-oil-seal structure comprises an oil-seal seat that is connected to the electric-machine end cap and an outer-side oil seal and an inner-side oil seal that are provided inside the oil-seal seat, the outer-side oil seal and the inner-side oil seal are provided face to face, and are interference-fitted to the oil-seal seat, and an oil storing chamber and an oil-seal spacer ring contained inside the oil storing chamber are provided between the outer-side oil seal and the inner-side oil seal.

Preferably, the outer-side oil seal and the inner-side oil seal are provided face to face, and an oil-seal spacer ring is provided between them.

Preferably, the oil-seal seat is detachably connected to the electric-machine end cap, the oil-seal seat is provided with an oil injecting hole and an external oil discharging hole that are in communication with the oil storing chamber, and the oil injecting hole and the external oil discharging hole are individually blocked by a plug.

Preferably, the oil-seal spacer ring is provided with a through hole in a radial direction that corresponds to the oil injecting hole and the external oil discharging hole, and the through hole is used as a channel for injecting oil into the oil storing chamber and discharging oil from the oil storing chamber.

Preferably, the electric-machine end cap and the oil-seal seat are of an integral structure.

Preferably, the oil-seal seat is provided with a breather hole that is in communication with the oil storing chamber, and a water-proof breather valve is provided inside the breather hole.

Preferably, the inner-side oil seal is positioned axially by using a retaining shoulder provided at an inner-side end of the oil-seal seat, and the outer-side oil seal is positioned axially by using a retaining ring that is connected to the oil-seal seat.

Preferably, a mudguard ring located on an outer side of the outer-side oil seal is nested to the electric-machine-shaft extension end.

Preferably, the electric-machine end cap is provided with an internal oil discharging hole for, when the inner-side oil seal fails, introducing an oil inside the oil storing chamber into an inner cavity of an electric machine.

Preferably, lips of the outer-side oil seal and the inner-side oil seal contact closely the electric-machine-shaft extension end.

The advantages and advantageous effects of the present disclosure are as follows.

In the sealing structure according to the present disclosure, the two oil seals are provided, between which an oil storing space is formed, and when the electric machine lacks of a lubricating medium in the interior, a lubricating oil can be injected, to provide a lubricating environment which is indispensable for the normal operation of the oil seals, thereby prolonging the service life and the sealing reliability of the oil seals.

In the present disclosure, the mudguard ring is placed in front of the outer-side oil seal, which prevents mud and sand from accumulating at the oil-seal holes, and prevents muddy water from directly sputtering on the oil seal, to provide protection.

In the present disclosure, the oil discharging hole is provided between the inner-side oil seal and the bearing, which prevents the lubricating liquid from, when the inner-side oil seal has leaked, polluting the lubricating grease of the bearing, to reduce the service life of the bearing.

In the present disclosure, the breather valve is mounted to the exterior of the oil-seal seat, to prevent seal failure or oil leakage caused by the variation of the internal gas pressure of the oil storing chamber due to temperature variation during the operation of the device.

BRIEF DESCRIPTION OF THE DRAWINGS

The present invention will hereinafter be described in conjunction with the following drawing figures, wherein like numerals denote like elements, and.

Figure 1:
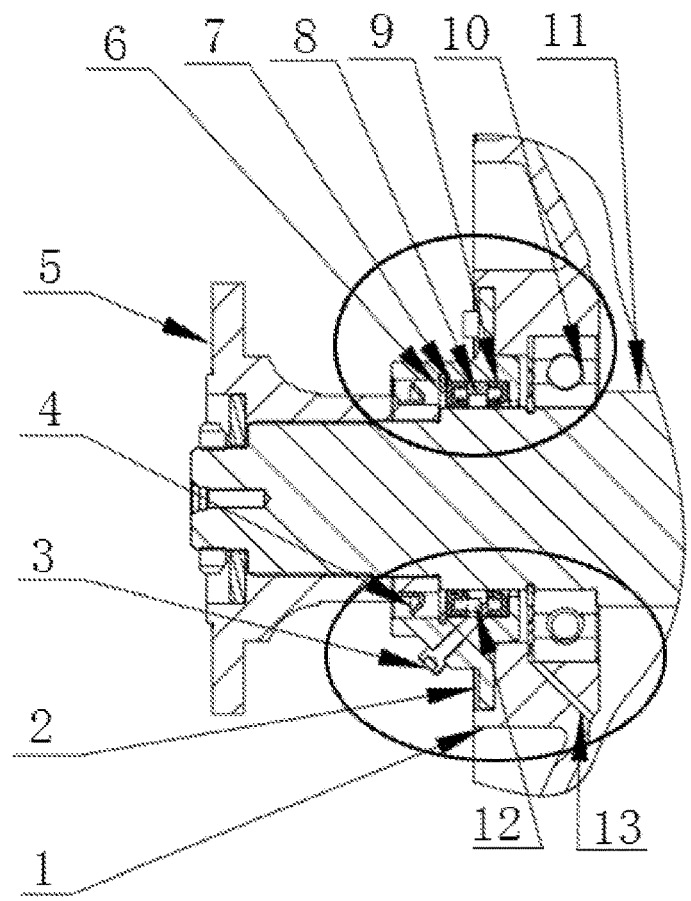
FIG. 1 is a schematic structural diagram according to the present disclosure.

In the drawings: 1 is the electric-machine end cap, 2 is the oil-seal seat, 3 is the plug, 4 is the mudguard ring, 5 is the connecting flange, 6 is the retaining ring, 7 is the outer-side oil seal, 8 is the oil-seal spacer ring, 9 is the inner-side oil seal, 10 is the bearing, 11 is the electric-machine-shaft extension end, 12 is the oil storing chamber, 13 is the internal oil discharging hole, and 14 is the water-proof breather valve, 16 is the oil injecting hole, 17 is the external oil discharging hole, 18 is the through hole.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The sealing members of conventional electric-machine sealing structures are susceptible to be affected by the environment, have a shortened life, and easily wear the main shaft of the electric machine. Therefore, the electric machine is required to be maintained frequently, which cannot satisfy the requirements for use.

In order to solve the problems of conventional electric-machine sealing structures of the short life of the sealing members and the easy wearing of the electric-machine shafts, the present disclosure employs a structure of double oil seals, between which an oil storing space is formed, and when a lubricating oil has been injected, a lubricating environment which is indispensable for the normal operation of the oil seals can be provided, thereby prolonging the service life and the sealing reliability of the oil seals.

In order to make the objects, the technical solutions and the advantages of the present disclosure clearer, the present disclosure will be described below in detail in conjunction with the drawings and the particular embodiments.

As shown in FIG. 1, the present disclosure provides a sealing structure of an electric-machine-shaft extension end, comprising an electric-machine end cap 1 and an electric-machine-shaft extension end 11, and the electric-machine-shaft extension end 11 being mounted to the electric-machine end cap 1 via a bearing 10, wherein a double-oil-seal structure is provided between the electric-machine end cap 1 and the electric-machine-shaft extension end 11, the double-oil-seal structure comprises an oil-seal seat 2 that is connected to the electric-machine end cap 1 and an outer-side oil seal 7 and an inner-side oil seal 9 that are provided inside the oil-seal seat 2, the outer-side oil seal 7 and the inner-side oil seal 9 are provided face to face, and are interference-fitted to the oil-seal seat 2, and an oil storing chamber 12 and an oil-seal spacer ring 8 contained inside the oil storing chamber 12 are provided between the outer-side oil seal 7 and the inner-side oil seal 9. The oil storing chamber 12 is used to store a lubricating oil, to guarantee that the oil seals operate in the presence of lubricating, and a lubricating environment which is indispensable for the normal operation of the oil seals can be provided, thereby prolonging the service life and the sealing reliability of the oil seals.

Both of the outer-side oil seal 7 and the inner-side oil seal 9 are a rubber-skeleton oil seal (the oil seals contain a spring). The lips of the outer-side oil seal 7 and the inner-side oil seal 9 contact closely the electric-machine-shaft extension end 11. The inner-side oil seal 9 is positioned axially by using a retaining shoulder provided at an inner-side end of the oil-seal seat 2, and the outer-side oil seal 7 is positioned axially by using a retaining ring 6 that is connected to the oil-seal seat 2. The retaining ring 6 is embedded in an annular groove provided at the inner wall of the oil-seal seat 2.

A mudguard ring 4 located on the outer side of the outer-side oil seal 7 is nested to the electric-machine-shaft extension end 11. The mudguard ring 4 can prevent mud and sand from accumulating at the oil-seal holes, and prevents muddy water from directly sputtering on the outer-side oil seal 7, to provide protection.

In an embodiment of the present disclosure, the oil-seal seat 2 is detachably mounted to the electric-machine end cap 1, which facilitates the detaching and the maintenance of the outer-side oil seal 7 and the inner-side oil seal 9 inside the oil-seal seat 2. The oil-seal seat 2 is provided with an oil injecting hole 16 and an external oil discharging hole 17 both of which are in communication with the oil storing chamber 12. The oil injecting hole 16 is used to inject oil into the oil storing chamber 12, and the external oil discharging hole 17 is used to discharge oil from the oil storing chamber 12 to exterior, which can realize the periodical renewal of the sealing medium. The oil injecting hole 16 and the external oil discharging hole 17 are individually blocked by a plug 3.

The external oil discharging hole 17 is provided at the bottom of the oil-seal seat 2, and the oil injecting hole 16 is provided at the sides or the top of the oil-seal seat 2.

The oil-seal spacer ring 8 is provided with a through hole 18 in the radial direction that corresponds to the oil injecting hole 16 and the external oil discharging hole 17. The through hole 18 is used as a channel for injecting oil into the oil storing chamber 12 and discharging oil from the oil storing chamber 12, which can guarantee that the oil smoothly flows from the oil injecting hole 16 into the oil storing chamber 12, and the oil smoothly flows out of the external oil discharging hole 17. The functions of the oil-seal spacer ring 8 are, firstly, to guarantee the axial positioning between the outer-side oil seal 7 and the inner-side oil seal 9, and, secondly, to enlarge the space of the oil storing chamber 12 between the outer-side oil seal 7 and the inner-side oil seal 9, to contain sufficient lubricating oil.

Figure 2A:
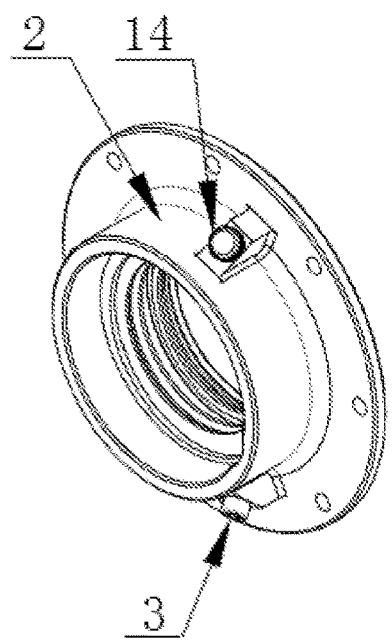
FIG. 2a is a schematic structural diagram of the oil-seal seat according to the present disclosure.
Figure 2B:
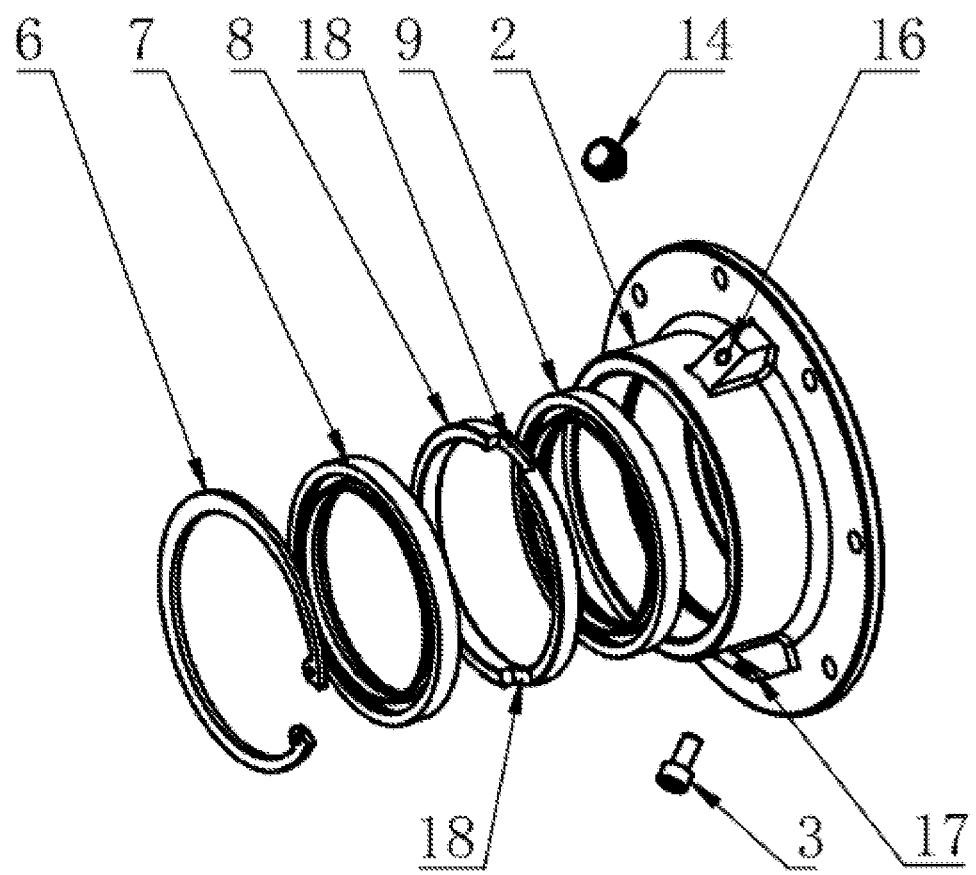
FIG. 2b is an exploded view of the oil-seal seat according to the present disclosure.
Figure 3A:
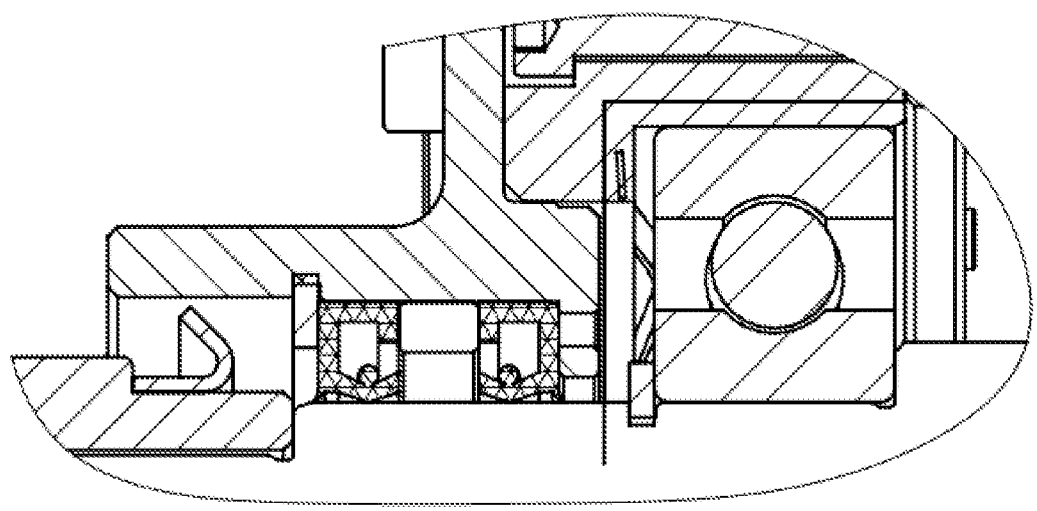
FIG. 3a is an expanded view of the upper circled portion of FIG. 1.
Figure 3B:
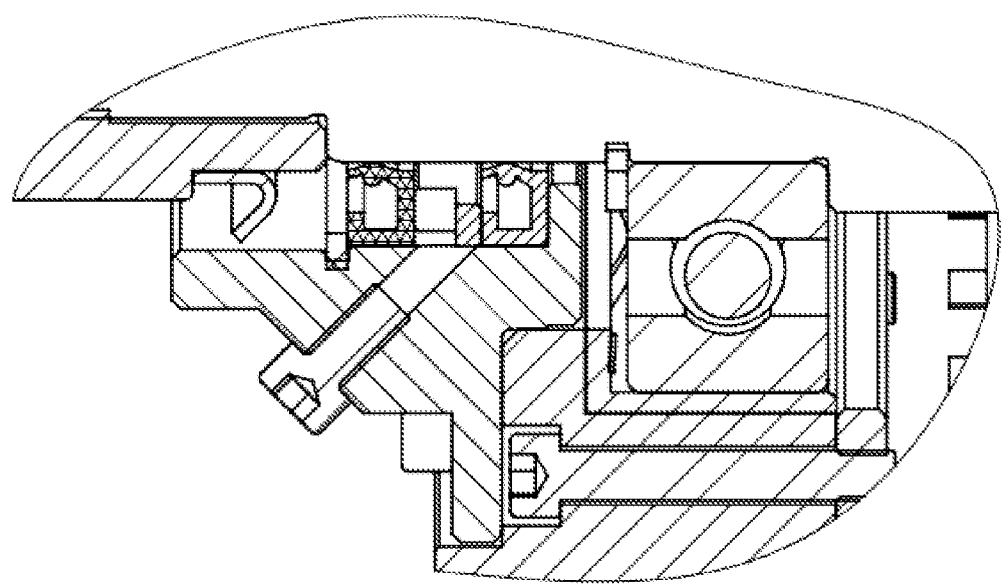
FIG. 3b is an expanded view of the lower circled portion of FIG. 1
Figure 3C:
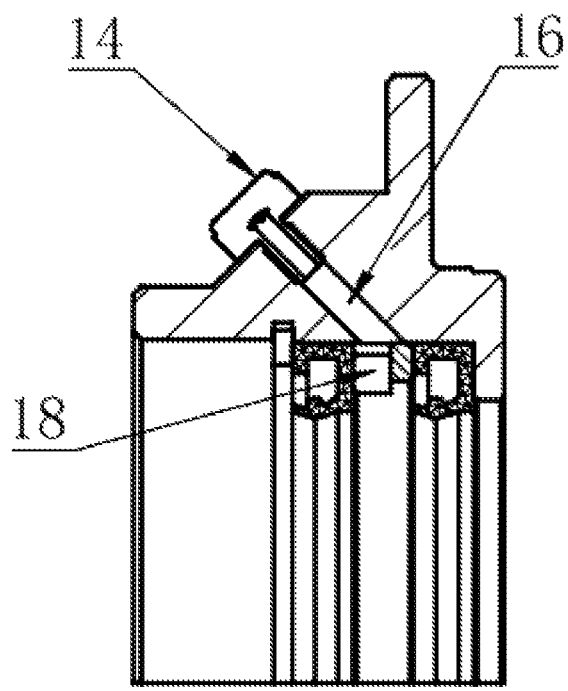
FIG. 3c is a sectional view of the oil injecting part.
Figure 3D:
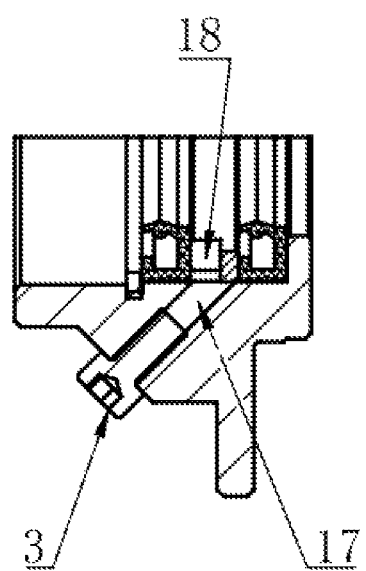
FIG. 3d is a sectional view of the oil discharging part.

As shown in FIG. 2, the oil-seal seat 2 is further provided with a breather hole that is in communication with the oil storing chamber 12, and a water-proof breather valve 14 is provided inside the breather hole, to prevent seal failure or oil leakage caused by the variation of the internal gas pressure of the oil storing chamber 12 due to temperature variation during the operation of the device.

The oil injecting hole may serve as the mounting hole of the water-proof breather valve 14, or the mounting hole may be provided separately.

The electric-machine end cap 1 is provided with an internal oil discharging hole 13 for, when the inner-side oil seal 9 fails, introducing the oil inside the oil storing chamber 12 into the inner cavity of the electric machine. One end of the internal oil discharging hole 13 is in communication with the gap between the inner-side oil seal 9 and the bearing 10, and the other end is in communication with the inner cavity of the electric machine. The internal oil discharging hole 13 prevents the lubricating liquid from, when the inner-side oil seal 9 has leaked, polluting the lubricating grease of the bearing 10, to reduce the service life of the bearing 10.

In another embodiment according to the present disclosure, the electric-machine end cap 1 and the oil-seal seat 2 are of an integral structure, so as to guarantee the coaxiality between the electric-machine end cap 1 and the oil-seal seat 2.

The sealing structure of an electric-machine-shaft extension end according to the present disclosure is a double-oil-seal sealing structure that contains a liquid oil product. It cannot only prevent the oil from leaking to the exterior of the electric machine, but also can prevent the oil from leaking to the interior of the electric machine, which is particularly suitable for the case that an electric machine does not have a sealing medium in the interior. By providing the two oil seals, an oil storing space is formed therebetween, and when a lubricating oil has been injected, a lubricating environment which is indispensable for the normal operation of the oil seals can be provided, thereby prolonging the service life and the sealing reliability of the oil seals. In addition, bearing damage can be prevented, thereby improving the reliability of the quality of the electric machine, and prolonging the service life of the electric machine.

In the present disclosure, the mudguard ring 4 is placed in front of the outer-side oil seal 7, which prevents mud and sand from accumulating at the oil-seal holes, and prevents muddy water from directly sputtering on the oil seal, to provide protection. The internal oil discharging hole 13 is provided between the inner-side oil seal 9 and the bearing 10, which prevents the lubricating liquid from, when the inner-side oil seal 9 has leaked, polluting the lubricating grease of the bearing, to reduce the service life of the bearing. The breather valve 14 is mounted to the exterior of the oil-seal seat 2, to prevent seal failure or oil leakage caused by the variation of the internal gas pressure of the oil storing chamber due to temperature variation during the operation of the device.

The above are merely embodiments of the present disclosure, and are not limiting the protection scope of the present disclosure. Any modifications, equivalent substitutions, improvements and extensions that are made within the spirit and principle of the present disclosure should fall within the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A sealing structure of an electric-machine-shaft extension end, comprising:
    an electric-machine end cap; and
    an electric-machine-shaft extension end, and the electric-machine-shaft extension end being mounted to the electric-machine end cap via a bearing,
    wherein a double-oil-seal structure is provided between the electric-machine end cap and the electric-machine-shaft extension end, the double-oil-seal structure comprises an oil-seal seat that is connected to the electric-machine end cap and an outer-side oil seal and an inner-side oil seal that are provided inside the oil-seal seat, the outer-side oil seal and the inner-side oil seal are provided face to face, and are interference-fitted to the oil-seal seat, and an oil storing chamber and an oil-seal spacer ring contained inside the oil storing chamber are provided between the outer-side oil seal and the inner-side oil seal,
    wherein the oil-seal seat is detachably connected to the electric-machine end cap, the oil-seal seat is provided with an oil injecting hole for injecting oil into the oil storing chamber and an external oil discharging hole for discharging oil from the oil storing chamber to exterior, and the oil injecting hole and the external oil discharging hole are individually blocked by a plug, and
    wherein the oil-seal spacer ring is provided with a through hole in a radial direction that corresponds to the oil injecting hole and the external oil discharging hole, and the through hole is used as a channel for injecting oil into the oil storing chamber and discharging oil from the oil storing chamber.

2. The sealing structure of an electric-machine-shaft extension end according to claim 1, wherein the electric-machine end cap and the oil-seal seat are of an integral structure.

3. The sealing structure of an electric-machine-shaft extension end according to claim 1, wherein the oil-seal seat is provided with a breather hole that is in communication with the oil storing chamber, and a water-proof breather valve is provided inside the breather hole.

4. The sealing structure of an electric-machine-shaft extension end according to claim 1, wherein the inner-side oil seal is positioned axially by using a retaining shoulder provided at an inner-side end of the oil-seal seat, and the outer-side oil seal is positioned axially by using a retaining ring that is connected to the oil-seal seat.

5. The sealing structure of an electric-machine-shaft extension end according to claim 1, wherein a mudguard ring located on an outer side of the outer-side oil seal is nested to the electric-machine-shaft extension end.

6. The sealing structure of an electric-machine-shaft extension end according to claim 1, wherein the electric-machine end cap is provided with an internal oil discharging hole for, when the inner-side oil seal fails, introducing an oil inside the oil storing chamber into an inner cavity of an electric machine.

7. The sealing structure of an electric-machine-shaft extension end according to claim 1, wherein lips of the outer-side oil seal and the inner-side oil seal contact closely the electric-machine-shaft extension end.

\* \* \* \* \*